(12) United States Patent
Gomez

(10) Patent No.: US 10,126,933 B2
(45) Date of Patent: Nov. 13, 2018

(54) PORTABLE APPLIANCE COMPRISING A DISPLAY SCREEN AND A USER INTERFACE DEVICE

(71) Applicants: ISORG, Grenoble (FR); Commissariat à l'énergie atomique et aux énergies alternatives, Paris (FR)

(72) Inventor: Jean-Yves Gomez, Grenoble (FR)

(73) Assignees: Commissariat à l'Energie Atomique et aux Energies Alternatives, Paris (FR); ISORG, Grenoble (FR)

( * ) Notice: Subject to any disclaimer, the term of this patent is extended or adjusted under 35 U.S.C. 154(b) by 0 days.

(21) Appl. No.: 14/435,356

(22) PCT Filed: Oct. 14, 2013

(86) PCT No.: PCT/FR2013/052450
§ 371 (c)(1),
(2) Date: Apr. 13, 2015

(87) PCT Pub. No.: WO2014/060693
PCT Pub. Date: Apr. 24, 2014

(65) Prior Publication Data
US 2015/0293661 A1  Oct. 15, 2015

(30) Foreign Application Priority Data

Oct. 15, 2012 (FR) ..................... 12 59824

(51) Int. Cl.
*G06F 3/0488* (2013.01)
*G06F 3/042* (2006.01)
(Continued)

(52) U.S. Cl.
CPC .......... *G06F 3/0488* (2013.01); *G06F 1/1626* (2013.01); *G06F 3/03547* (2013.01); *G06F 3/042* (2013.01)

(58) Field of Classification Search
CPC ................... G06F 3/042; G06F 3/0421; G06F 2203/04101; G06F 2203/04102;
(Continued)

(56) References Cited

U.S. PATENT DOCUMENTS 5,051,570 A  9/1991  Tsujikawa et al.
8,354,666 B2  1/2013  Lee et al.
(Continued)

FOREIGN PATENT DOCUMENTS

EP  2107446 A1  10/2009
JP  H01150192 A  6/1989
(Continued)

OTHER PUBLICATIONS

"Written Opinion of the International Searching Authority" dated Feb. 4, 2014, issued in counterpart International Application No. PCT/FR2013/052450.
(Continued)

*Primary Examiner* — Md Saiful A Siddiqui
(74) *Attorney, Agent, or Firm* — Kaplan Breyer Schwarz, LLP

(57) ABSTRACT

A portable appliance has a display screen on a first surface and a user interface device on a second surface different from the first surface. The device includes a photon detector array.

10 Claims, 5 Drawing Sheets

(51) Int. Cl.
*G06F 1/16* (2006.01)
*G06F 3/0354* (2013.01)

(58) Field of Classification Search
CPC . G06F 2203/04108; G06F 2203/04104; G06F 2203/04106; G06F 2203/04103; G06F 3/0488; G06F 3/03547; G06F 1/1626
See application file for complete search history.

(56) References Cited

U.S. PATENT DOCUMENTS

| | | |
|---|---|---|
| 2002/0063813 A1 | 5/2002 | Dirschert et al. |
| 2002/0093027 A1 | 7/2002 | Zhong et al. |
| 2003/0052847 A1 | 3/2003 | Okishiro et al. |
| 2003/0086030 A1 | 5/2003 | Taniguchi et al. |
| 2004/0114061 A1 | 6/2004 | Kimura et al. |
| 2005/0280637 A1 | 12/2005 | Ikeda et al. |
| 2006/0145365 A1* | 7/2006 | Halls ............... B82Y 10/00 347/238 |
| 2007/0139386 A1* | 6/2007 | Martin ............. G06F 3/04886 345/173 |
| 2007/0210242 A1* | 9/2007 | Cho .................. A61B 5/0059 250/221 |
| 2007/0287394 A1* | 12/2007 | Swan .............. G08B 13/19621 455/127.5 |
| 2007/0300182 A1* | 12/2007 | Bilow ................ G06F 3/0488 715/799 |
| 2008/0068484 A1 | 3/2008 | Nam |
| 2008/0121442 A1 | 5/2008 | Boer et al. |
| 2008/0122798 A1 | 5/2008 | Koshiyama et al. |
| 2008/0150848 A1 | 6/2008 | Chung et al. |
| 2008/0226146 A1 | 9/2008 | Niklan |
| 2008/0231926 A1 | 9/2008 | Klug et al. |
| 2008/0297487 A1* | 12/2008 | Hotelling ............ G06F 1/3203 345/173 |
| 2009/0027371 A1 | 1/2009 | Lin et al. |
| 2009/0123029 A1 | 5/2009 | Harada et al. |
| 2009/0128508 A1* | 5/2009 | Sohn ................. G06F 3/0421 345/173 |
| 2009/0177586 A1 | 7/2009 | Niklan |
| 2009/0237372 A1 | 9/2009 | Kim et al. |
| 2009/0267919 A1 | 10/2009 | Chao et al. |
| 2009/0273580 A1 | 11/2009 | Ota et al. |
| 2009/0315834 A1 | 12/2009 | Nurmi et al. |
| 2010/0007839 A1 | 1/2010 | Jun et al. |
| 2010/0013793 A1 | 1/2010 | Abileah et al. |
| 2010/0027295 A1 | 2/2010 | Lee |
| 2010/0067235 A1 | 3/2010 | Yamashita et al. |
| 2010/0103139 A1* | 4/2010 | Soo ................... G06F 3/0416 345/175 |
| 2010/0283763 A1 | 11/2010 | Kim et al. |
| 2010/0294936 A1* | 11/2010 | Boberl ................ B82Y 30/00 250/338.4 |
| 2010/0295797 A1 | 11/2010 | Nicholson et al. |
| 2010/0295821 A1* | 11/2010 | Chang ............... G06F 3/0421 345/175 |
| 2010/0315413 A1 | 12/2010 | Izadi et al. |
| 2011/0043473 A1 | 2/2011 | Kozuma |
| 2011/0043486 A1 | 2/2011 | Hagiwara et al. |
| 2011/0134055 A1 | 6/2011 | Jung et al. |
| 2011/0175830 A1 | 7/2011 | Miyazawa et al. |
| 2011/0222011 A1 | 9/2011 | Murai et al. |
| 2011/0273390 A1 | 11/2011 | Nakatsuji |
| 2011/0291946 A1 | 12/2011 | Mann et al. |
| 2011/0316679 A1* | 12/2011 | Pihlaja .............. G06F 3/04815 340/407.2 |
| 2012/0069042 A1 | 3/2012 | Ogita et al. |
| 2012/0162558 A1 | 6/2012 | Chung et al. |
| 2012/0182261 A1 | 7/2012 | Wang et al. |
| 2013/0007653 A1* | 1/2013 | Stolyarov ........... G06F 1/1626 345/173 |
| 2013/0076695 A1 | 3/2013 | Gomez et al. |
| 2014/0306097 A1 | 10/2014 | Gomez et al. |
| 2014/0362051 A1 | 12/2014 | Gomez et al. |
| 2015/0062461 A1 | 3/2015 | Tallal et al. |
| 2015/0220211 A1 | 8/2015 | Gras et al. |

FOREIGN PATENT DOCUMENTS

| | | |
|---|---|---|
| JP | 2007183706 A | 7/2007 |
| JP | 2009271225 A | 11/2009 |
| JP | 2010015485 A | 1/2010 |
| JP | 2010055507 A | 3/2010 |
| JP | 2010182046 A | 8/2010 |
| JP | 2011070658 A | 4/2011 |
| JP | 2012098959 A | 5/2012 |
| JP | 2012524306 A | 10/2012 |
| WO | 2010058629 A1 | 5/2010 |
| WO | 2010135127 A1 | 11/2010 |
| WO | 2011119483 A1 | 9/2011 |
| WO | 2010122865 A1 | 10/2012 |

OTHER PUBLICATIONS

"International Search Report" issued in counterpart International Application No. PCT/FR2013/052450, dated Feb. 4, 2014, Publisher: EPO as International Searching Authority.

Willem Den Boer, et al., "Active Matrix LCD with Integrated Optical Touch Screen", 2003, Publisher: SID 03 Digest.

Officer: J. Legrand, "International Search Report," dated Nov. 13, 2013, issued in PCT International Application No. PCT/FR2013/052090, which is a counterpart of related U.S. Appl. No. 14/427,551.

Officer: J. Legrand "Written Opinion of the International Searching Authority," dated Nov. 13, 2013, issued in PCT International Application No. PCT/FR2013/052090, which is a counterpart of related U.S. Appl. No. 14/427,551.

"Final Office Action", dated Sep. 30, 2015, issued in related U.S. Appl. No. 13/569,379.

"Non-final Office Action", dated Dec. 17, 2015, issued in related U.S. Appl. No. 14/347,986.

"Non-Final Office Action", dated Nov. 17, 2016, issued in related U.S. Appl. No. 14/391,986.

"Non-final Office Action", dated Jul. 28, 2016, issued in related U.S. Appl. No. 14/427,551.

"Notice of Allowance," dated Apr. 13, 2016, issued in related U.S. Appl. No. 14/347,986.

"Written Opinion of the International Searching Authority," dated Nov. 26, 2012, issued in PCT International Application No. PCT/FR2012/051863, which is a counterpart of U.S. Appl. No. 14/347,982.

Officer: Llorens V. Charcos "Written Opinion of the International Searching Authority," dated Nov. 26, 2012, issued in PCT International Application No. PCT/FR2012/051864, which is a counterpart of U.S. Appl. No. 14/347,986.

Officer: Jacques Durand "International Search Report," dated Jul. 12, 2013, issued in PCT International Application No. PCT/FR2013/050777, which is a counterpart of U.S. Appl. No. 14/391,986.

Officer: Simin Baharlou, "Written Opinion of the International Searching Authority," dated Jul. 12, 2013, issued in PCT International Application No. PCT/FR2013/050777, which is a counterpart of U.S. Appl. No. 14/391,986.

"Non Final Office Action" dated Oct. 21, 2015, issued in related U.S. Appl. No. 14/347,982.

V. Charcos Llorens, "Search Report," dated Apr. 27, 2012, issued in French Application No. 11/58611, which is a counterpart of related U.S. Appl. No. 13/569,379.

Jean-Yves Laurent et al, "CEA-LITEN S2S printing platform for Organic CMOS and Sensors Devices", "Proceedings LOPE-C Conference 2011", Jun. 2011, Publisher: CEA-Liten Institute, Published in: Frankfurt.

"Non Final Office Action", dated Feb. 27, 2014, issued in related U.S. Appl. No. 13/569,379.

Officer: V. Charcos Llorens, "International Search Report", dated Nov. 26, 2012, issued in related PCT International Patent Application No. PCT/FR2012/051864, which is a counterpart of related U.S. Appl. No. 14/347,986.

(56) References Cited

OTHER PUBLICATIONS

Hoffner, Linh Nguyen, "Final Office Action," dated Sep. 10, 2014, issued in related U.S. Appl. No. 13/569,379.
"Non-final Office Action," dated Apr. 3, 2015, issued in related U.S. Appl. No. 13/569,379.
Linh Nguyen Hoffner, "Advisory Action," dated Dec. 24, 2014, issued in related U.S. Appl. No. 13/569,379.
Jamet, Laurent: "The Next Big Wave in the Electronics Industry," OnBoard Technology Sep. 14, 2011—pp. 32-34 (XP002674899).
Jamet, Laurent: "Organic photodetectors & image sensors, highly innovative products for new markets and attractive business opportunities for printed electronics industry," Printed Electronics and Photovoltaics Europe 2011, Idtechex, UK Apr. 6, 2011, pp. 1-17 (XP008151359).
Christophe Premont, "Photo detectors and sensors designed to be flexible (XP002674972)", "Electronic Engineering Times Europe", Sep. 14, 2011, pp. 17-18, Publisher: URL:http:::/www.isorg.fr/edito/files/photodectors_and_sensors_designed_to_be_flexible_798566.pdf, Published in: FR.
Marie Freebody, "New Materials Build Better Organic Photodetectors (XP002674974)", Aug. 9, 2011, pp. 13, Publisher: URL:http://www.isorg.fr/edito/files/new_materials_build_better_organic_photodetectors_174887.pdf, Published in: FR.
Officer: V. Charcos Llorens, "International Search Report," dated Nov. 26, 2012, issued in related PCT International Patent Application No. PCT/FR2012/051863, which is a counterpart of U.S. Appl. No. 14/347,982.
"Office Action" issued in Japanese patent application No. 2015-505003, dated Dec. 20, 2016.
"Office Action" issued in related U.S. Appl. No. 14/391,986, dated Jun. 27, 2017.
"Notice of Allowance" issued in related U.S. Appl. No. 14/391,986, dated Oct. 5, 2017.
"Non-Final Office Action" issued in related U.S. Appl. No. 14/391,986, dated Nov. 17, 2016.
"Non-Final Office Action" issued in related U.S. Appl. No. 14/427,551, dated Jul. 28, 2016.
"Final Office Action" issued in related U.S. Appl. No. 14/427,551, dated Dec. 9, 2016.
"Non-Final Office Action" issued in related U.S. Appl. No. 14/427,551, dated Jul. 12, 2017.
"Final Office Action" dated Dec. 14, 2017 issued in related U.S. Appl. No. 14/427,551.
"Japanese Office Action", in counterpart Japanese Patent Application No. JP2015537328, dated Jun. 14, 2017, 4 pp.

* cited by examiner

PORTABLE APPLIANCE COMPRISING A DISPLAY SCREEN AND A USER INTERFACE DEVICE

The present patent application claims priority from French patent application FR12/59824 which is incorporated herein by reference.

BACKGROUND

The present invention relates to a portable system comprising a display screen and a user interface device, particularly, a cell phone, a wireless phone, a computer phone, an audio player, a video player, a mini portable computer, an electronic reader, a tablet, a camera, a remote control, an analysis device, or a sensor.

DISCUSSION OF THE RELATED ART

User interfaces for portable systems have become more and more sophisticated, and many user interfaces now comprise display screens.

Examples of user interface devices of a portable system comprising a display screen comprise a keyboard, buttons, thumbwheels, switches, joysticks, or touch screens.

SUMMARY

An embodiment provides a portable system comprising a display screen on a first surface and a user interface device on a second surface different from the first surface, the device comprising an array of photon sensors.

According to an embodiment, the device is capable of detecting variations of the shadow of an actuating member and/or of the reflection of a radiation by the actuating member.

According to an embodiment, the device is capable of deducing, from the variations of the shadow of an actuating member and/or of the reflection of a radiation by the actuating member, information representative of a variation of the position of the actuating member relative to the sensor array.

According to an embodiment of the present invention, the device is capable of deducing, from the shadow variations and/or the variations of the reflected radiation, information representative of a variation of the position of the actuating member parallel to the sensor array.

According to an embodiment, the first surface is opposite to the second surface.

According to an embodiment, the device is capable of detecting variations of the light intensity level received by the sensors.

According to an embodiment, the device further comprises a control unit connected to the display and to the user interface device and capable of controlling a modification of the display on the display screen when the user interface device detects the actuating member in a range of positions relative to the sensor array.

According to an embodiment, a translucent protection layer covers the sensor array.

According to an embodiment, the surface area of the sensor array is larger than the surface area of the actuating member opposite said array.

According to an embodiment, the photons sensors are made of transparent materials.

According to an embodiment, the device further comprises electromagnetic wave emitters.

According to an embodiment, the device further comprises an array of emitters of a visible or infrared radiation.

According to an embodiment, the device further comprises a waveguide covering the array of photon sensors and emitters of a visible or infrared radiation at the periphery of the waveguide.

According to an embodiment, the photon sensors are organic sensors formed by deposition of organic semiconductor and conductor materials in liquid form on a dielectric support.

According to an embodiment, the device is a cell phone, a wireless phone, a computer phone, an audio player, a video player, a mini portable computer, an electronic reader, a tablet, a camera, a remote control, an analysis device, or a sensor.

BRIEF DESCRIPTION OF THE DRAWINGS

The foregoing and other features and advantages will be discussed in detail in the following non-limiting description of specific embodiments in connection with the accompanying drawings, among which.

For clarity, the same elements have been designated with the same reference numerals in the various drawings and, further, as usual in the representation of circuits, the various drawings are not to scale.

DETAILED DESCRIPTION

Figure 1:
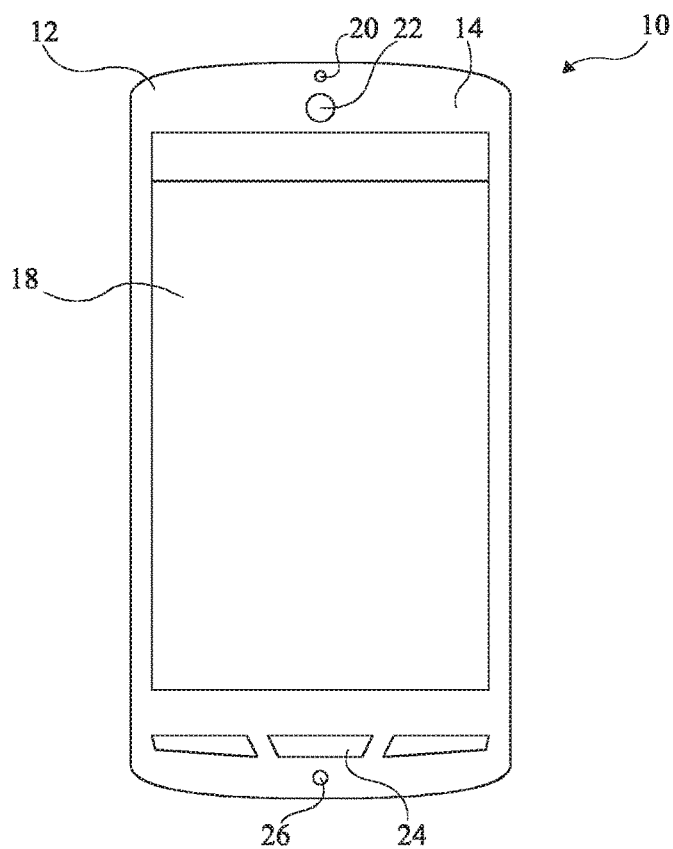
FIG. 1 is a simplified view of the front side of an embodiment of a portable system comprising a display screen.

Only those elements which are useful to the understanding of the described embodiments have been shown and will be described. In particular, what use is made of the portable systems comprising a display screen and a user interface device described hereafter has not been detailed. Further, the means for controlling the information supplied by the user interface devices described hereafter are within the abilities of those skilled in the art and are not described in detail.

Many user interfaces use touch screens capable of detecting that they have been touched by a finger or a stylus. There exist many types of touch screens, particularly those using capacitive sensors or resistive sensors.

Touch screens are convenient in portable systems due to the simplicity of their use. Menu elements may be displayed on the screen and the user can directly interact with the menu elements by touching or hitting them, without having to position or manipulate an indicator on the screen such as a pointer, an arrow, or a cursor. Further, the touch function of the display screen enables to decrease the number of additional input peripherals such as buttons, thumbwheels, switches, joysticks, etc.

However, a disadvantage of this type of interface is that the touch screen tends to rapidly get dirty in contact with the users' fingers. This implies regularly cleaning the screen, in particular in case of a use in dirty environments (factories, public transport, etc.).

Another disadvantage of touch screens is that the user's fingers may hide part of the screen from the user. It may further be difficult for a user to both hold the portable system and to perform an accurate touch input on the screen, particularly with a single hand. For this reason, many devices are more difficult to use than it would be desirable.

Thus, an object of an embodiment is to provide a portable system comprising a display screen at least partly overcoming some of the disadvantages of existing devices.

Another object of an embodiment is to facilitate the use of the portable system.

Another object of an embodiment is to decrease the alteration of the cleanness of the display of the portable system.

Another object of an embodiment is to avoid hiding any part of the display when the system is being used.

Another object of an embodiment is to decrease the number of manual input peripherals, such as buttons, thumbwheels, switches, or joysticks.

Another object of an embodiment is for the portable system comprising a display screen to be easier to form than known devices.

According to an embodiment, the portable system comprises a first surface having a display screen located thereon and a second surface, for example, opposite to the first surface, having a contact or contactless user interface device provided thereon. "User interface device" means an interface device by means of which the user can act on the device.

An embodiment where the portable system is a cell phone will be described. It should however be clear that this embodiment may apply to any type of portable system comprising a display screen.

Figure 2:
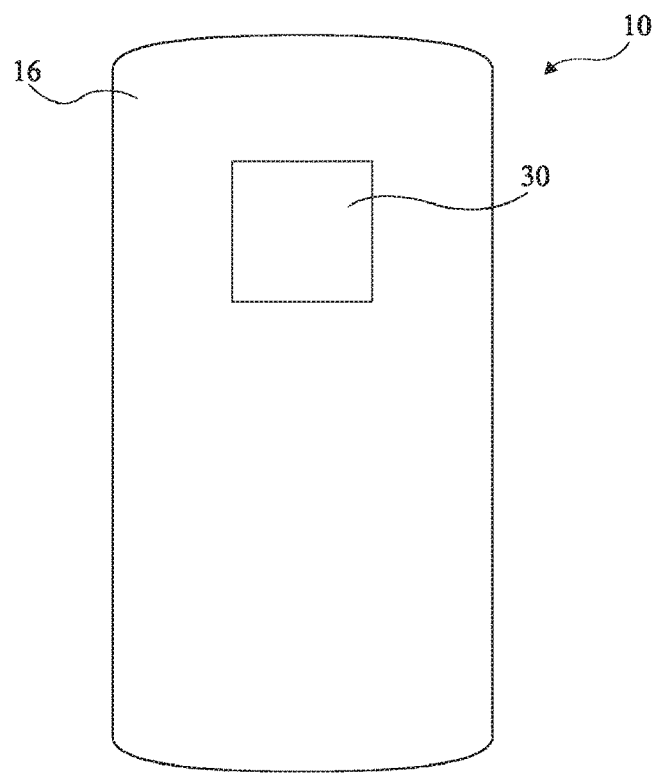
FIG. 2 is a simplified view of the back side of the device of FIG. 1.

FIGS. 1 and 2 show views of the front and back sides of an embodiment of a cell phone 10. Cell phone 10 comprises a thin and substantially rectangular package 12 which comprises two opposite sides, a front side 14 and a back side 16, for example, substantially planar and parallel. A display screen 18 is provided on surface 14. A speaker 20, enabling, in particular, to emit a speaker's voice received by cell phone 10 during a phone call, and a camera 22 are provided on front side 12, in the upper portion of display 18. Keys 24 and a microphone 26, particularly enabling to receive the user's voice during a phone call are, further, provided on front side 12 and at the lower portion of display screen 18.

A user interface device 30 is provided on back side 16 of cell phone 10. The exposed surface of user interface device 30 may be square-shaped, rectangular, or have any other shape. The exposed surface of user interface device 30 may be as large as the surface area of display screen 18 or may be smaller than the surface area of display screen 18. As an example, the exposed surface may have an area in the range from 1 $cm^2$ to 10 $cm^2$. It may have a rectangular or square shape, for example, of 1 cm by 1 cm, 2 cm by 2 cm, 1.5 cm by 2.5 cm, or 2 cm by 2.5 cm. The exposed surface area of device 30 may be proportional to the surface area of display screen 18. As an example, for a display screen 18 of 11 cm by 6 cm, the exposed surface of device 30 may have a rectangular shape of 3.7 cm by 2 cm.

Figure 3:
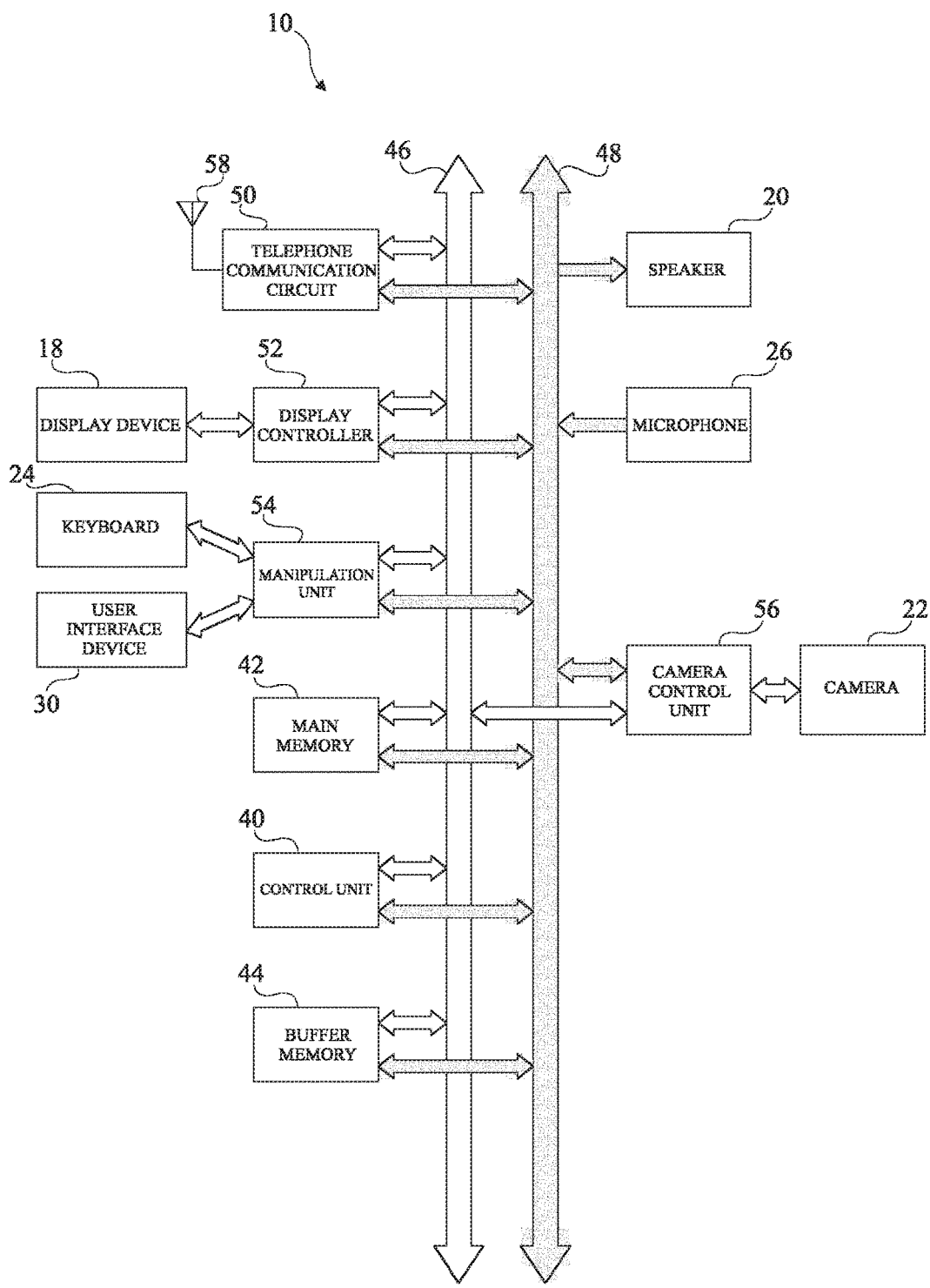
FIG. 3 is a block diagram illustrating an embodiment of the internal circuit of the portable system of FIG. 1.

FIG. 3 is a block diagram illustrating an embodiment of the internal circuit of cell phone 10 of FIGS. 1 and 2.

Cell phone 10 comprises a control unit 40, a main memory 42, for example, a non-transient memory, and a buffer memory 44, for example, a non-transient memory, which are connected to a system bus, comprising a control bus 46 and a data bus 48. Further, a communication circuit 50 (Telephone Communication Circuit), a display controller 52, a user interface management unit 54 (Manipulation Unit), and a camera control unit 56 are connected to the system bus.

Main control unit 40 comprises a processor comprising a non-volatile memory which stores instructions of a computer program to control the operation of cell phone 10. Control unit 40 may execute a plurality of control processes which are based on the instructions of the stored computer program.

Main memory 42 stores, for example, data such as telephone directory data or e-mail addresses. Further, main memory 42 may store images or videos acquired by using camera 22. Buffer memory 44 is used as a work memory when control unit 40 executes the processes based on the computer program instructions.

Telephone communication circuit 50 is a radio communication unit for establishing a telephone communication or another type of distant communication (for example, for data exchange via the Internet) via a base station and a mobile telephony network. It receives/transmits communication data via an antenna 58.

Speaker 20 and microphone 26 are connected to data bus 48. Speaker 20 operates as an emitter of audio messages and microphone 26 operates as an audio message receiver. In a telephone communication between the user of cell phone 10 and a speaker, a voice message of the speaker received by telephone communication circuit 50 is emitted by speaker 20 under control of control unit 40, and the user's voice received by microphone is transmitted to the person he/he is speaking to via telephone communication circuit 50. In the present embodiment, telephone communication circuit 50 may further transmit and/or receive data representative of the digital images acquired by camera 22 in the case of videotelephony.

Display device 18 is connected to display control unit 52. On request of control unit 40, unit 52 may control display screen 18 to display images and/or videos, for example, the image of the person communicating with the user of cell phone 10 in the case of videotelephony.

Interface management unit 54 is connected to the keys of keyboard 24 and to user interface device 30. Control unit 40 is configured to detect, based on the signals provided by interface management unit 54, the type of key which is pressed or the interaction of the user with user interface device 30, and to execute the corresponding operation.

Camera 22 is connected to camera control unit 56. When the picture or video acquisition function or the videotelephony function is activated via user interface device 30 and interface management unit 54, the digital images acquired by camera 22 are received by data bus 48 via camera control unit 56.

Figure 4:
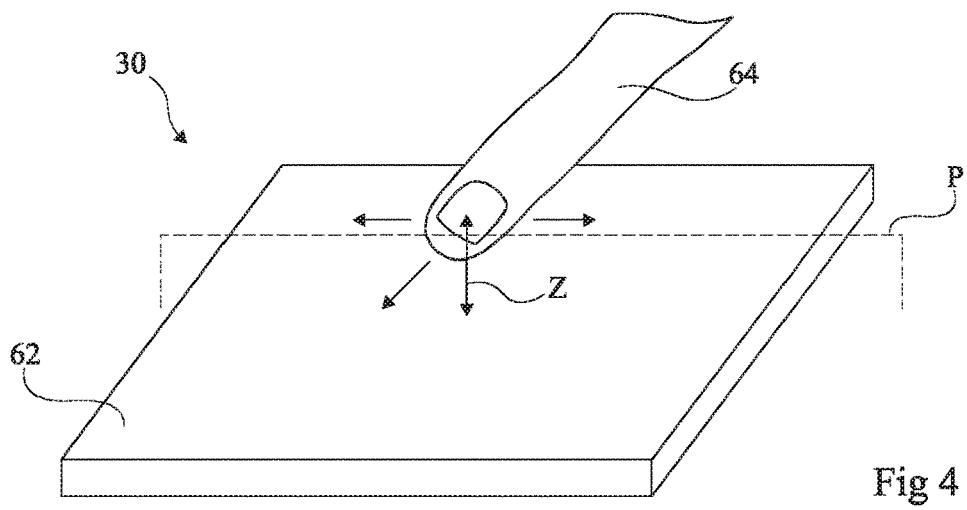
FIG. 4 is a perspective view schematically showing an embodiment of the user interface device of the portable system of FIG. 1.
Figure 5:
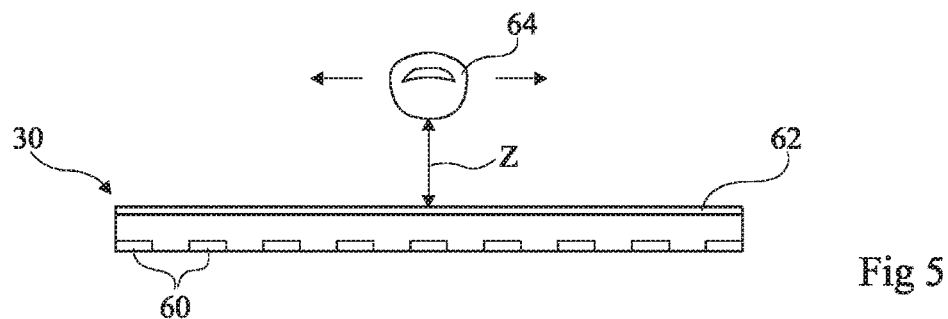
FIG. 5 is a cross-section view of the user interface device of FIG. 4.

FIGS. 4 and 5 schematically show an embodiment of user interface device 30. FIG. 4 is a perspective view of device 30, and FIG. 5 is a cross-section view along plane P of FIG. 4.

Device 30 comprises an array of photon sensors or photodetectors 60 (FIG. 5). In this example, sensors 60 are arranged on a planar surface. Embodiments may however be provided where sensors 60 are arranged on a non-planar surface. Sensor array 60 may be topped with a transparent or translucent protective coating 62, for example, a glass plate or a plastic coating, for example, made of polymethyl methacrylate or PMMA.

Device 30 comprises an array of photon sensors, or photodetectors 60. The array may comprise from approximately 20,000 to approximately 250,000 photodetectors 60. Photodetectors 60 may be distributed in rows and in columns. The array for example is a square or rectangular array. As an example, an array of 50,000 photodetectors may correspond to an array of 200 rows and 250 columns or to an array of 225 rows and 225 columns. As an example, an array of 250,000 photodetectors may correspond to an array of 500 rows and 500 columns or to an array of 400 rows and 600 columns. To allow the recognition of a fingerprint, the resolution of photodetector array 60 is preferably in the range from approximately 200 ppp to approximately 600 ppp, preferably from approximately 400 ppp to approximately 600 ppp.

Actuating member 64 may be the user's finger, hand, or any other object. In particular, in the present embodiment where portable system 10 is a cell phone, actuating member 64 is preferably a user's finger, for example, the index finger or the middle finger or the user's hand which is holding cell phone 10.

Figure 6:
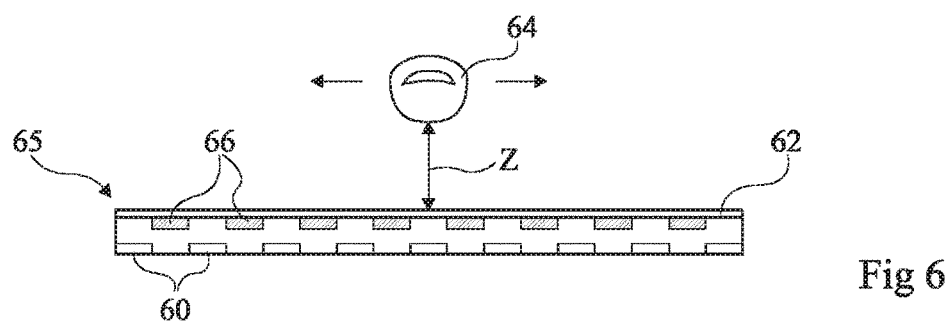
FIGS. 6, 7, and 8 are cross-section views showing other embodiments of a user interface device.

FIG. 6 is a cross-section view of an embodiment of user interface device 65 where device 65 comprises the same elements as device 30 of FIGS. 4 and 5, and further comprises an array of emitters 66 of a radiation, for example, visible or infrared. Emitters 66 are, for example, light-emitting diodes. In this example, emitters 66 are arranged in a plane parallel to photodetector array 60, and between the photodetector array and protective coating 62.

Photodetector array 60 and emitters 66 are stacked with a slight offset so that, in top view, emitters 66 are not located opposite sensors 60, which would mask sensors 60 and would prevent the detection of the image of actuating member 64. Further, opaque walls, not shown, may be provided on the side of each emitter 66 located opposite sensors 60 to avoid for sensors 60 to directly receive the radiation emitted by emitters 66. In another embodiment photon sensor array 60 is placed between emitter array 66 and protective coating 62.

Figure 7:
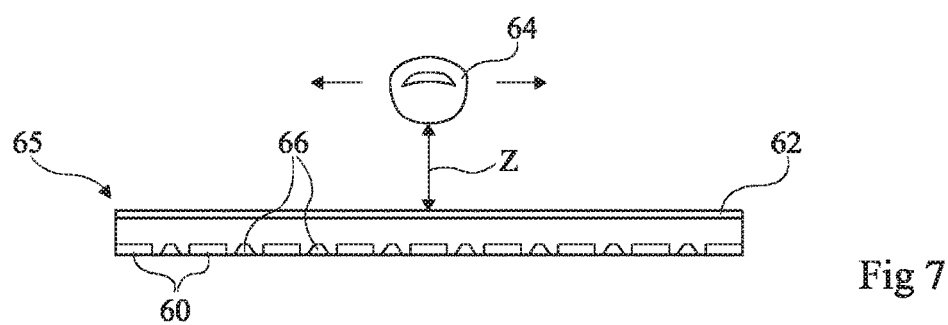

FIG. 7 is a cross-section view showing another embodiment of device 65 where sensor array 60 and emitter array 66 are formed in a same level of the stack of conductor and semiconductor layers. Emitters 66 may be alternated with sensors 60.

Figure 8:
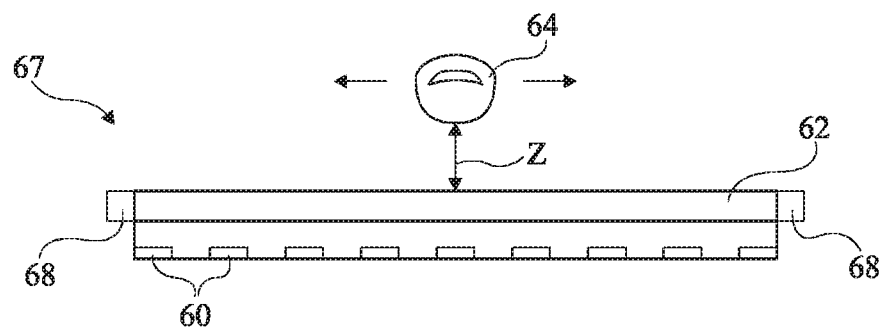

FIG. 8 is a cross-section view showing another embodiment where user interface device 67 comprises emitters of a radiation. The emitters may comprise light-emitting diodes 68 arranged at the periphery of a waveguide which may correspond to protective coating 62. Protective coating 62 then guides the radiation emitted by light-emitting diodes 68 to illuminate actuating member 64. According to another embodiment, photodetector array 60 is arranged between the waveguide and protective coating 62.

Device 30, 65, 67 is capable of detecting the position of an actuating member 64 relative to sensor array 60. Actuating member 64 may be placed directly opposite sensor array 60, that is, no optical system is provided between the array and the actuating member. The surface area taken up by sensor array 60 is preferably greater than the surface area of the projection of actuating member 64 in the plane of this array. More generally (in particular, if sensor array 60 does not occupy a planar surface), the surface area of sensor array 60 is greater than the surface area of actuating member 64 in front of this array. In particular, device 30, 65, 67 may be capable of detecting displacements of the actuating member in a plane parallel to the plane of sensor array 60, and variations of distance Z between actuating member 64 and sensor array 60.

According to an embodiment, which may be implemented with device 30 shown in FIGS. 4 and 5, device 30 is capable of detecting variations of the cast shadow of an actuating member 64 on sensor array 60, when actuating member 64 is arranged between a light source and the array, and of deducing therefrom information representative of a variation of the position of the actuating member. The light source is preferably ambient light, for example, the sun, or the indoor electric lighting of a room in a building.

According to another embodiment, which may be implemented with device 30 shown in FIGS. 6 to 8, the user interface device further comprises a source of a radiation capable of being reflected, at least partly, by the actuating member. The user interface device is capable of detecting the radiation reflected onto the photodetector array and of deducing therefrom information representative of a variation of the position of the actuating member. The radiation is for example visible or infrared. In this case, the reflection/diffusion of the visible or infrared radiation on the actuating member, seen by the photon sensors, is preferably used to obtain information relative to the position of the actuating member.

For this purpose, in an initialization phase, device 30, 65, 67 measures the ambient brightness, that is, the light intensity received by each sensor 60 when no actuating member is arranged in front of sensor array 60.

In the case of shading detection, when actuating member 64 is placed between the light source and the sensor array, the cast shadow of the actuating member on the sensor array causes a decrease in the light intensity received by some of sensors 60. In the case of the detection of the radiation reflected by actuating member 64, the reflected radiation may cause an increase of the light intensity received by some of sensors 60. This enables device 30, 65, 67 to detect the presence of actuating member 64 close to the array and, possibly, to follow the displacements of the actuating member in a plane parallel to the plane of the array (or parallel to the surface occupied by the array if this surface is not planar).

When distance Z between the actuating member and sensor array 60 varies, the light intensity level received by sensors 60 also varies. In particular, in the case of shading detection, when actuating member 64 is brought closer to sensor array 60, the light intensity received by sensors 60 in the shadow of the actuating member decreases, and when actuating member 64 is taken away from the sensor array, the light intensity increases. In the case of the detection of the radiation reflected by actuating member 64, when actuating member 64 is brought closer to sensor array 60, the light intensity received by sensors 60 in the shadow of the actuating member increases, and when actuating member 64 is taken away from the sensor array, the light intensity decreases.

Device 30, 65, 67 is capable of deducing from the intensity variations of the cast shadow of actuating member 64 or of the radiation reflected by actuating member 64 information relative to the variations of distance Z between actuating member and sensor array 60. In an alternative embodiment, a calibration phase matching the intensity level of the cast shadow of the actuating member or of the radiation reflected by the actuating member with the distance between actuating member 64 and sensors 60 may be provided. This enables device 30, 65, 67 to measure distance Z between actuating member 64 and sensors 60.

Thus, in an embodiment, the device is capable of detecting the position in three dimensions of actuating member 64 in the space located in front of the sensor array.

An advantage of interface device 30, 65, 67 described in relation with FIGS. 4 to 8 is that it is capable of being actuated with no contact with the user. It should however be noted that device 30, 65, 67 may also operate as a touch-sensitive surface, that is, if the user slides his/her finger on the upper surface of the device (upper surface of protective coating 62 in this example), the device will be capable of determining the position in two dimensions of the actuating member on the sliding surface (distance Z equal to the thickness of protective coating 62).

According to another embodiment, device 30, 65, 67 is configured to only detect displacements of actuating member 64 when actuating member 64 is in contact with sensor array 60 or very close to sensor array 60.

Another advantage of interface device 30, 65, 67 is that it enables to provide information relative to the distance between the actuating member and sensors 60. This for example enables to implement applications of control of three-dimensional virtual objects, or of three-dimensional navigation.

In the previously-described embodiment where device 30 comprises no light sources, the shadow of the actuating member, cast on the detection surface, is used to obtain information relative to the position of the actuating member. According to another embodiment, the image of actuating member 64, seen by photon sensors 60, may be used. It should be noted that in practice, the cast shadow and the image of the actuating member do not coincide, except if the light source is placed exactly in the axis of projection of the actuating member on the sensor array. As a variation, device 30 may detect both the cast shadow and the image of the actuating member to obtain more accurate information relative to the position or to the position variations of the actuating member. Interface management unit 54 or main control unit 40 for example comprises a software for processing the signals delivered by photodetector array 60, capable of detecting the cast shadow and possibly the image of actuating member 64.

In the embodiments shown in FIGS. 6 to 8, each of emitters 66, 68 permanently emits a radiation in operation. When actuating member 64 flies above protective coating 62, part of the emitted radiation is reflected/diffused by actuating member 64 towards neighboring photodetectors 60. Interface management unit 54 or control unit 40 may deduce therefrom information relative to the presence of an object above the interface. Thus, emitters 66, 68, in combination with photodetectors 60, enable device 65, 67 to implement the same functions of detection of the variations of the position of actuating member 64 as photodetectors 60 alone used as shading detectors.

An advantage of the detection of the reflection/diffusion of the radiation by actuating member 64 over the detection of the shadow of actuating member 64 is that its operation is independent from the ambient lighting and thus more robust. In particular, the detection of the reflection of a radiation by the actuating member may operate in the dark, in the absence of a light source external to cell phone 10. It may be provided to alternate between a low-consumption operating mode, based on the detection of the cast shadow of the actuating member by photodetectors 60 when the ambient lighting allows it, and an operating mode by detection of the reflection/diffusion of a radiation by actuating member 64 when the lighting conditions do not allow the cast shadow detection. Cell phone 10 may comprise a darkness sensor to automatically switch from the low-consumption mode to the detection mode by reflection when the ambient luminosity becomes too low to allow the cast shadow detection.

When emitters 66, 68 are infrared emitters, an infrared emission with a frequency modulation may be provided, which enables, on reception by photodetectors 60, to discriminate shading from infrared signal reflection. This enables to simultaneously use the infrared operation and the operation by cast shadow detection to obtain more accurate information relative to the position of actuating member 64. The infrared emission with a frequency modulation further enables to decrease the power consumption of the infrared source.

Figure 9:
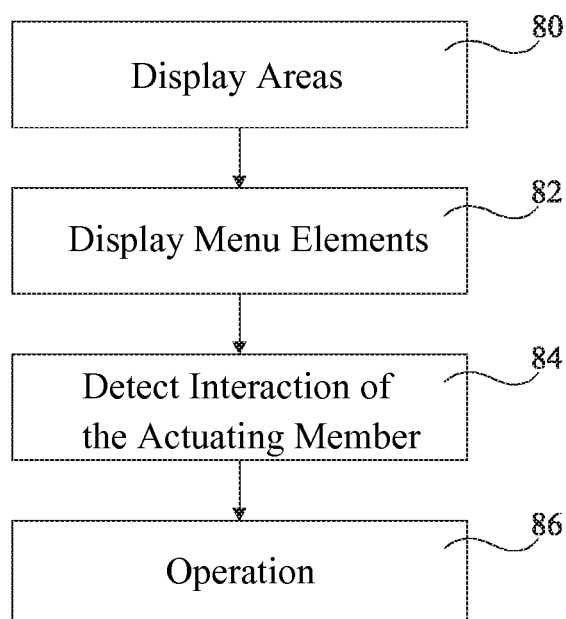
FIG. 9 is a block diagram illustrating an embodiment of a method of using the portable system of FIG. 1.

FIG. 9 illustrates an embodiment of a method of using cell phone 10 shown in FIGS. 1 and 2.

At step 80, an image is displayed on screen 18 of cell phone 10. The image may comprise visually-delimited display areas. As an example, the image may comprise a first display area having the same shape as user interface device 30 at the same scale or at an enlarged scale. Second display areas may be displayed in the first area. Each display area corresponds to a range of positions of actuating member 64 relative to user interface device 30. The method carries on at step 82.

At step 82, menu elements are displayed in the display areas. The method carries on at step 84.

At step 84, control unit 40 determines whether a menu element is selected or activated by the user. The menu element located in one of the display areas may be selected or activated by a specific interaction between actuating member 34 and user interface device 30. The method carries on at step 86. Examples of interaction which may cause the selection of a menu element displayed in a display area having a range of positions of the actuating member relative to the user interface device corresponding thereto are the following:

- a detection, whatever its duration, of actuating member 34 in this range of positions;
- an uninterrupted detection, for a given duration, of actuating member 34 in this range of positions;
- two or more detections of actuating member 34 for a given duration in this range of positions, separated by a lack of detection of actuating member 34 by interface device 30;
- a displacement in a specific direction, for example, from left to right or from top to bottom, of actuating member 34 in this range of positions; and
- the stopping of the detection of the actuating member after a continuous detection of the actuating member by user interface device 30, the stopping of the detection occurring in this range of positions.

At step 86, control unit 40 carries out the operation associated with the selection of the menu element by the user. The operation may correspond to the establishing of a telephone communication with another person, the acquisition of data via the Internet, etc. The operation may correspond to a modification of the menu elements displayed in the display areas and the method then carries on at step 82.

According to an embodiment, screen 18 may further be a touch screen. In this case, an interaction of the user with cell phone 10 may be performed by touching display screen 18 at the location of the desired menu element, as an alternative to an interaction with interface device 30 on the back side of cell phone 10.

According to an embodiment, photodetectors 60 of user interface device 30, 65, 67 may be formed based on organic semiconductor and conductor materials.

Figure 10A:
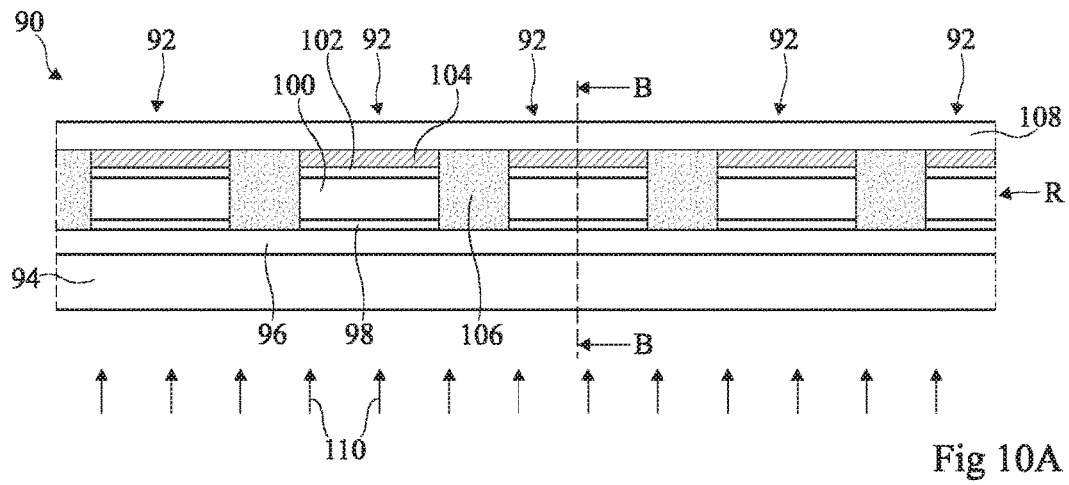
FIGS. 10A and 10B are cross-section views partially and schematically showing an embodiment of a user interface device based on organic semiconductor and conductor materials.
Figure 10B:
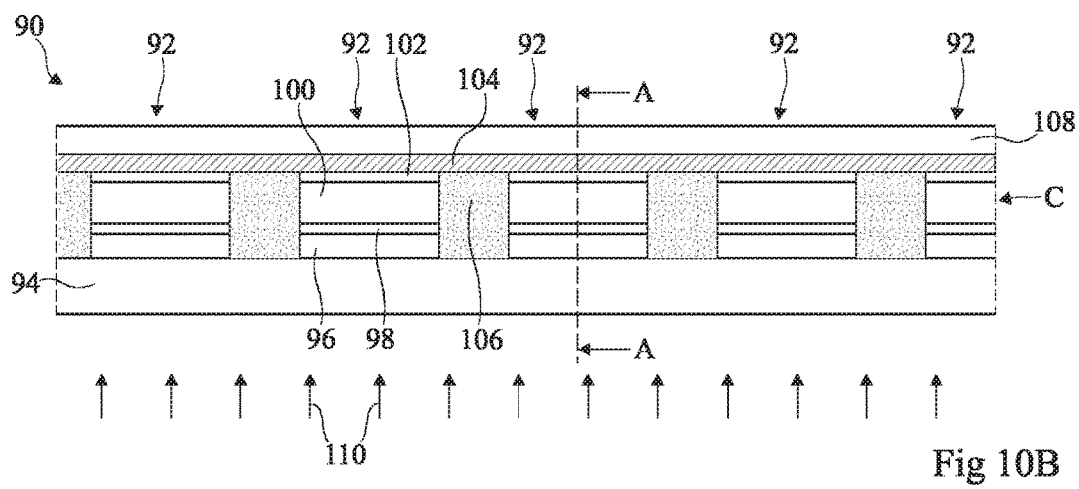

FIGS. 10A and 10B are cross-section views schematically and partially showing an embodiment of a user interface device 90 based on organic semiconductor and conductor materials. FIG. 10B is a cross-section view in plane B of FIG. 10A, and FIG. 10A is a cross-section view in plane A of FIG. 10B.

Device 90 comprises an array of photons sensors, or photodetectors 92, capable of detecting variations of the cast shadow of an actuating member (not shown in FIGS. 10A and 10B) or capable of detecting the reflection of light waves by the actuating member. In this example, photodetectors 92 are formed on a surface of a transparent or translucent dielectric substrate or support 94, for example, made of glass or plastic.

Each photodetector 92 comprises a stack comprising, in the following order from substrate 94:
a transparent electrode 96 made of a TCO material;
an electron injection portion 98, for example, made of heavily-doped transparent organic semiconductor polymer or of a transparent conductive metal oxide, for example, of ZnO type;
a portion 100 made of a mixture of organic semiconductor polymers, for example poly(3-hexylthiophene) or poly(3-hexylthiophene-2,5-diyl) (P-type semiconductor), known as P3HT, mixed with [6,6]-phenyl-$C_{61}$-methyl butanoate (N-type semiconductor), known as PCBM;
a portion 102 of heavily-doped organic semiconductor polymer (for example, a polymer known as PEDOT:PSS, which is a mixture of poly(3,4)-ethylenedioxythiophene and of polystyrene sodium sulfonate;
an electrode 104, for example, made of gold or silver.

A protective coating 108 covers the upper surface of the array (on the side of electrode 104).

Lower electrodes 96 have, in top view, the shape of parallel strips, each strip 96 addressing all the photodetectors of a same row R (FIG. 10A) of the array. Upper electrodes 104 have, in top view, the shape of strips orthogonal to electrodes 96, each strip 104 addressing all the photodetectors of a same column C (FIG. 10B) of the array. In this example, lower electrode layer 96 extends continuously under each row R of photodetectors 92 of the array, and upper electrode layer 104 extends continuously on each column C of photodetectors 92 of the array. Laterally, semiconductor regions 100 of photodetectors 92 are separated from one another by a dielectric material 106. Further, a transparent protective coating 108 covers the upper surface of the array (side of electrodes 104).

In this example, photodetectors 92 are intended to be illuminated through transparent substrate 94 (and through transparent layers 96 and 98). In FIGS. 10A and 10B, the incident radiation is shown by arrows 110, on the side of substrate 94.

Figure 11:
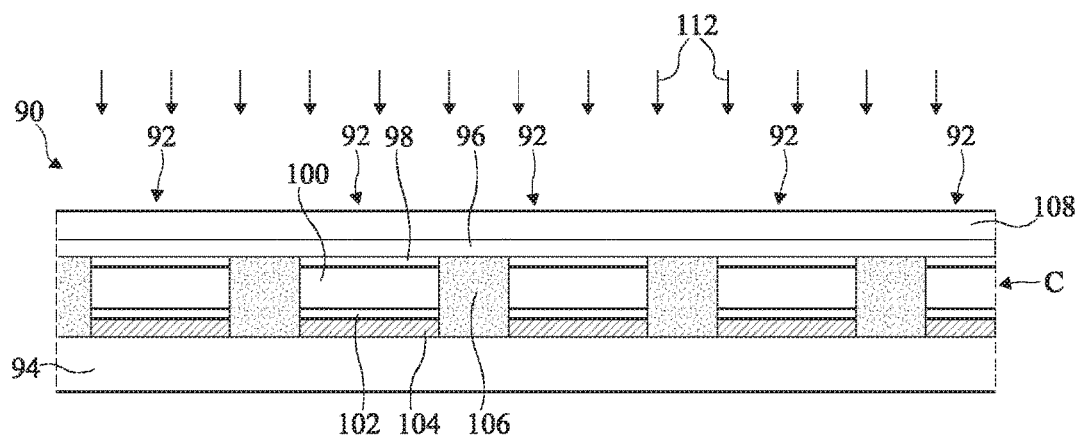
FIG. 11 is a cross-section view partially and schematically showing an alternative embodiment of the device of FIGS. 10A and 10B.

FIG. 11 is a cross-section view schematically and partially showing an alternative embodiment of device 90 of FIGS. 10A and 10B. The device of FIG. 11 differs from the device of FIGS. 10A and 10B in that the order of photodetector layers 92 is inverted. FIG. 11 is a cross-section view along a column C of photodetectors. The corresponding cross-section (along a row) has not been shown.

In this example, each photodetector 92 comprises a stack comprising, in the following order from substrate 94, an electrode 104, for example, made of aluminum or of silver, a layer 102 made of a heavily-doped organic semiconductor polymer (hole donor layer), a layer 100 made of organic semiconductor polymer, a layer 98 of heavily-doped transparent organic semiconductor polymer (electron donor layer), and a transparent electrode 96. A transparent protective coating 108 covers the upper surface of the array (on the side of electrodes 96).

Photodetectors 92 are here intended to be illuminated through protective coating 108 (and through transparent layers 96 and 98). In FIG. 11, the incident radiation is shown by arrows 112, on the side of transparent coating 108.

It is here provided to form device 90 by printing techniques. The materials of above-mentioned layers 96 to 108 are deposited in liquid form, for example, in the form of conductor and semiconductor inks by means of inkjet printers. It should here be noted that materials in liquid form here also mean gel materials capable of being deposited by printing techniques. Anneal steps may be provided between the depositions of the different layers, but the anneal temperatures may not exceed 150° C., and the deposition and the possible anneals may be performed at the atmospheric pressure.

The forming of organic semiconductor components by printing techniques is for example described in article "CEA-LITEN S2S printing platform for Organic CMOS and Sensors Devices" by Jean-Yves Laurent et al., LOPE-C Conference, June 2011, Frankfurt.

An advantage of device 90 is that it can be more easily formed than existing devices. In particular, it may be formed on a greater variety of surfaces, and particularly on larger surface areas and on any type of substrate, including on substrates having no resistance to heat, for example, flexible substrates made of plastic, paper, cardboard, fabric, etc. It should be noted that in the device of FIGS. 10A and 10B, if the substrate is opaque, upper electrode 104 may be made of a transparent conductive material, and the device may be illuminated on its front side (in the orientation of the drawing).

Further, device 90 may be formed by using equipment (print deposition equipment) compatible with industrial equipment for manufacturing packages, plastics engineering, etc.

Another advantage of device 90 is that its cost is relatively low, since the equipment necessary for its manufacturing (print deposition equipment) is less expensive than the equipment necessary to form inorganic semiconductor devices, and also less expensive than usual equipment used to form organic semiconductor components (low-pressure vapor deposition and high-temperature anneal equipment).

Various alterations, modifications, and improvements will readily occur to those skilled in the art. In particular, it will be within the abilities of those skilled in the art to provide any adapted stack of layers, other than those described in relation with FIGS. 10A, 10B, and 11, to form a photodetector. It may particularly use conductive, semiconductor, and dielectric materials capable of being deposited in liquid form, other than those mentioned hereabove.

More generally, it is provided to form touch-sensitive or contactless user interface devices where semiconductor components are formed by deposition of liquid organic semiconductor and conductor materials on a dielectric support. Apart from the photodetector array, emitters of a visible or infrared radiation may also be formed by printing of organic materials.

Further, although this has not been mentioned hereabove, it may be provided to have, in the photodetector array, one or a plurality of access transistors associated with each photodetector (active array). The transistors may also be formed from organic semiconductor materials in liquid or gel form, by printing techniques.

Further, although the previously-described embodiments relate to a portable system comprising a first surface having a display screen placed thereon and a second surface opposite to the first surface having a user interface device placed thereon, it should be clear that the first and second surfaces, different though they may be, are not necessarily opposite. Thus, according to an embodiment, the second surface may be perpendicular to the first surface.

The invention claimed is:

1. A portable system comprising:
    a package having a first side and a second side, the first side facing a first direction and the second side facing away from the first side in a second direction;
    a display screen viewable on the first side of the package;
    a user interface device accessible by an actuating member on the second side of the package, the user interface device comprising an array of photon sensors disposed in rows and in columns and an array of emitters of a visible radiation or an infrared radiation disposed in rows and in columns, the array of photon sensors comprising organic sensors formed by deposition of organic semiconductor and conductor materials in liquid form on a dielectric support;
    a control unit connected to the display screen and to the user interface device, the control unit controlling a modification of a display on the display screen when the user interface device detects the actuating member in a range of positions relative to the array of photon sensors; and
    a darkness sensor;
    wherein the user interface device operates in a first mode and a second mode to deduce information representative of a variation of a position of the actuating member relative to the array of photon sensors, in the first mode, from the variation of a shadow of the actuating member, and, in the second mode, from the variation of a reflection of a radiation by the actuating member, the user interface device automatically switching between the first mode and the second mode based on an ambient luminosity detected by the darkness sensor.

2. The system of claim 1, wherein the user interface device deduces information representative of a variation of a position of the actuating member parallel to the array of photon sensors from at least one of the variations of the shadow of the actuating member and the variations of the reflection of radiation by the actuating member.

3. The system of claim 1, wherein the first surface is opposite to the second surface.

4. The system of claim 1, wherein the user interface device detects variations of a light intensity level received by the array of photon sensors.

5. The system of claim 1, wherein a translucent protection layer covers the array of photon sensors.

6. The system of claim 1, wherein a surface area of the array of photon sensors is larger than a surface area of the actuating member, which is opposite said array of photon sensors.

7. The system of claim 1, wherein the array of photon sensors are made of transparent materials.

8. The system of claim 1, wherein the user interface device further comprises electromagnetic wave emitters.

9. The system of claim 1, wherein the user interface device further comprises a waveguide covering the array of photon sensors and emitters of a visible radiation or an infrared radiation at a periphery of the waveguide.

10. The system of claim 1, wherein the system is a cell phone, a wireless phone, a computer phone, an audio player, a video player, a mini portable computer, an electronic reader, a tablet, a camera, a remote control, an analysis device, or a sensor.

* * * * *